(12) United States Patent
Li et al.

(10) Patent No.: US 12,312,525 B2
(45) Date of Patent: May 27, 2025

(54) METHOD FOR PREPARING FLUORESCENT CARBON QUANTUM DOTS BY USING GAS-LIQUID TWO-PHASE PLASMA

(71) Applicant: Xi'an Jiaotong University, Xi'an (CN)

(72) Inventors: Yuan Li, Xi'an (CN); Jing Gao, Xi'an (CN); Guanjun Zhang, Xi'an (CN)

(73) Assignee: Xi'an Jiaotong University, Xi'an (CN)

(*) Notice: Subject to any disclaimer, the term of this patent is extended or adjusted under 35 U.S.C. 154(b) by 908 days.

(21) Appl. No.: 17/474,086

(22) Filed: Sep. 14, 2021

(65) Prior Publication Data
US 2023/0002673 A1    Jan. 5, 2023

(30) Foreign Application Priority Data
Jul. 3, 2021    (CN) .......................... 202110750654.6

(51) Int. Cl.
| | |
|---|---|
| *B32B 9/00* | (2006.01) |
| *C01B 32/15* | (2017.01) |
| *C09K 11/65* | (2006.01) |
| *C25B 1/135* | (2021.01) |
| *C25B 1/50* | (2021.01) |
| *C25B 15/08* | (2006.01) |
| *B82Y 20/00* | (2011.01) |
| *B82Y 40/00* | (2011.01) |

(52) U.S. Cl.
CPC .............. *C09K 11/65* (2013.01); *C01B 32/15* (2017.08); *C25B 1/135* (2021.01); *C25B 1/50* (2021.01); *C25B 15/085* (2021.01); *B82Y 20/00* (2013.01); *B82Y 40/00* (2013.01); *C01P 2004/04* (2013.01); *C01P 2004/64* (2013.01); *C01P 2006/60* (2013.01)

(58) Field of Classification Search
CPC ....... Y10T 428/30; C01B 32/15; B82Y 20/00; B82Y 40/00
See application file for complete search history.

(56) References Cited

FOREIGN PATENT DOCUMENTS

| CN | 1108411577 | * | 2/2020 |
| WO | WO 2017/182860 | * | 12/2016 |

* cited by examiner

*Primary Examiner* — Daniel H Miller

(57) ABSTRACT

A method for preparing fluorescent carbon quantum dots by using gas-liquid two-phase plasma is provided, which relates to the field of fluorescent carbon quantum technology. On the basis of liquid phase plasma, an inert gas is introduced to generate plasma by a gas-liquid two-phase discharge method. The introduction of inert gas facilitates the formation of discharge channels, reduces the difficulty of product synthesis, improves mass transfer rates of active particles, helps to improve synthesis rates of carbon nanoproducts, increases discharge contact area and enhances discharge stability. A high reaction efficiency and a short time consumption can be realized. A pulsed power supply is adopted for discharge, which has lower energy consumption compared with the direct current discharge. Moreover, the process is simple, raw materials are easy to obtain, and there is no need for catalysts, strong oxidants or strong corrosives, so the purity of the product maybe higher.

3 Claims, 2 Drawing Sheets

METHOD FOR PREPARING FLUORESCENT CARBON QUANTUM DOTS BY USING GAS-LIQUID TWO-PHASE PLASMA

FIELD OF THE DISCLOSURE

The disclosure relates to the field of carbon quantum dot technologies, and more particularly to a method for preparing fluorescent carbon quantum dots by using gas-liquid two-phase plasma.

BACKGROUND OF THE DISCLOSURE

Carbon nanomaterials show excellent characteristics in light, magnetism, electricity, heat, sound and so on due to their surface effect, small size effect, quantum size effect and macro quantum tunneling effect. The carbon nanomaterials have shown outstanding advantages in many fields such as energy, biology, medicine, measurement and manufacturing, and have become the frontiers and hotspots of current scientific communities. Carbon quantum dots are a kind of spherical zero-dimensional carbon nanomaterials with particle sizes less than 10 nanometers (nm). The carbon quantum dots have the advantages of low toxicity, stable fluorescence characteristics and good biocompatibility, so they are widely used in the fields of biological imaging, fluorescent labeling, bio sensors and so on.

At present, preparation methods of fluorescent carbon quantum dots mainly include a laser method, a microwave synthesis method, an arc discharge method, a chemical vapor deposition method, a hydrothermal/solvothermal method, a liquid plasma method and so on. Equipment required by the laser method is complex and expensive, and the yield is not high, so it is not suitable for large-scale production. The chemical vapor deposition method requires to add catalysts, but the introduction of catalysts makes products easy to contain impurities, and the purity of the product needs to be improved. Growth processes of carbon quantum dots by the microwave synthesis method and the arc discharge method are difficult to control, and the particle sizes are uneven. The hydrothermal/solvothermal method usually needs a long heating time, so that the preparation time is excessively long and the energy consumption is excessively high. The liquid plasma method has advantages of simple operation, rich in raw materials and fast preparation speed, but the liquid discharge is unstable and the discharge process is of great randomness, and the applied discharge voltage is relatively large. Therefore, it is of great significance to reduce the discharge voltage and improve the discharge stability of the liquid phase plasma method/technology.

SUMMARY OF THE DISCLOSURE

In view of shortcomings of the prior art, the disclosure provides a method for preparing fluorescent carbon quantum dots by using gas-liquid two-phase plasma. The method of the disclosure may have advantages of low discharge voltage, stable discharge, simple operation and fast preparation speed.

In particular, a method for preparing fluorescent carbon quantum dots by using gas-liquid two-phase plasma according to an embodiment of the disclosure may include steps as follows:

step S1: preparing a reaction solution and inserting two electrodes into the reaction solution, then injecting an inert gas into the reaction solution and applying a voltage onto both ends of the two electrodes under an atmosphere of the inert gas for carrying out a discharge reaction to generate plasma between the two electrodes until a color of the reaction solution becomes yellowish-brown; and step S2: performing a centrifugal separation of the reaction solution after the discharge reaction to remove the sediment, thereby obtaining fluorescent carbon quantum dots.

In a preferred embodiment, the reaction solution includes at least one selected from the group consisting of absolute ethanol, hexane, cyclohexane, benzene and methylbenzene.

In a preferred embodiment, the inert gas is argon, and a gas flow rate of the argon gas is 0.5~2 liters per minute (L/min).

In a preferred embodiment, each of the two electrodes is a hollow stainless-steel tube with an outer diameter of 4 millimeters (mm) and an inner diameter of 3 mm, and a distance between the two electrodes is 1~4 mm.

In a preferred embodiment, the voltage applied onto both ends of the two electrodes is a pulsed voltage with a voltage amplitude of 2~4 kilovolts (kV) and a frequency of 1~3 kilohertz (kHz), and a current is 60~90 amperes (A).

In a preferred embodiment, a time of the discharge reaction is 5~30 minutes (min).

Compared with the prior art, the embodiments of the disclosure may mainly have the following beneficial effects.

1. the embodiments of the disclosure use a gas-liquid two-phase discharge method to generate plasma, and the introduction of inert gas facilitates the formation of discharge channels, which can reduce the difficulty of product synthesis, can effectively improve mass transfer rates of active particles, can help to improve synthesis rates of carbon nano-products, and can effectively increase the discharge contact area and enhance the discharge stability.

2. the embodiments of the disclosure may have the advantages of high reaction efficiency and short time consumption. A pulsed power supply is adopted for discharge, which has lower energy consumption compared with the direct current discharge. Moreover, the process is simple, raw materials are easy to obtain, and there is no need for catalysts, strong oxidants or strong corrosives, so the purity of the product may be higher.

DETAILED DESCRIPTION OF EMBODIMENTS

The disclosure is further described below in combination with specific embodiments.

Embodiment 1

A reaction device (also referred to as reactor) is added with 80 milliliters (mL) of absolute ethanol. Two electrodes are then inserted and completely immersed in the absolute ethanol. The reaction device is introduced with argon gas with a gas flow rate of 1 liter per minute (L/min). Each of the two electrodes is a hollow stainless-steel tube with an outer diameter of 4 millimeters (mm) and an inner diameter of 3 mm, and the spacing/distance between the two electrodes is 1 mm A pulsed high voltage is applied onto both ends of the two electrodes in the argon gas atmosphere with a voltage amplitude of 2.5 kilovolts (kV) and a frequency of 2 kilohertz (kHz), and a current is 80 amperes (A). After 15 minutes (min) of electro-discharge, the color of a reaction solution changes to yellowish-brown. The reaction solution is then centrifuged to remove a bottom sediment to thereby obtain a mixture of carbon quantum dots.

Figure 1:
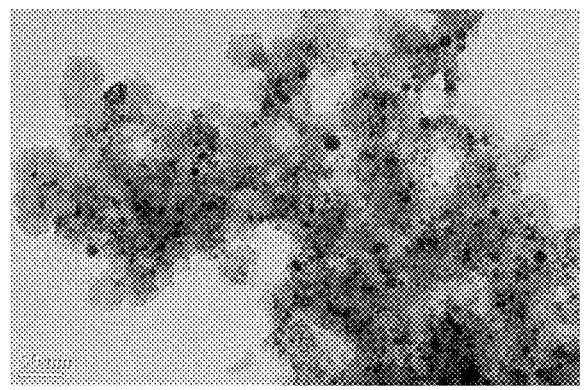
FIG. 1 is a transmission electron microscopy (TEM) image of fluorescent carbon quantum dots prepared in an embodiment 1 of the disclosure.

As can be seen from FIG. 1, fluorescent carbon quantum dots prepared by the embodiment 1 of the disclosure have uniform/even particles and good dispersion.

Figure 2:
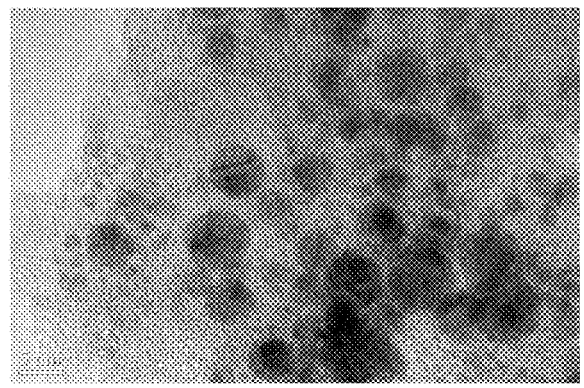
FIG. 2 is a high-resolution transmission electron microscopy (HRTEM) image of fluorescent carbon quantum dots prepared in the embodiment 1 of the disclosure.

As can be seen from FIG. 2, the fluorescent carbon quantum dots prepared by the embodiment 1 of the disclosure have a relatively high crystallinity.

Figure 3:
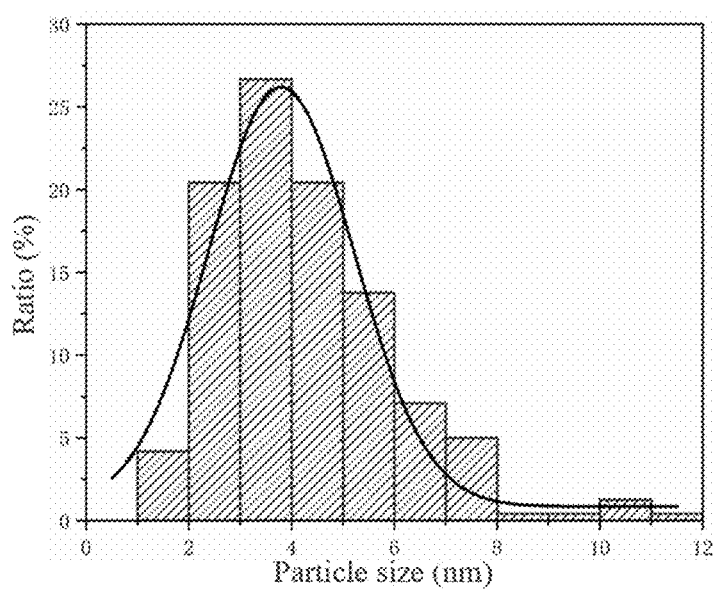
FIG. 3 is a particle size distribution diagram of fluorescent carbon quantum dots prepared in the embodiment 1 of the disclosure.

As can be seen from FIG. 3, particle diameters of the fluorescent carbon quantum dots prepared by the embodiment 1 of the disclosure are in a range of 2~6 nanometers (nm).

Figure 4:
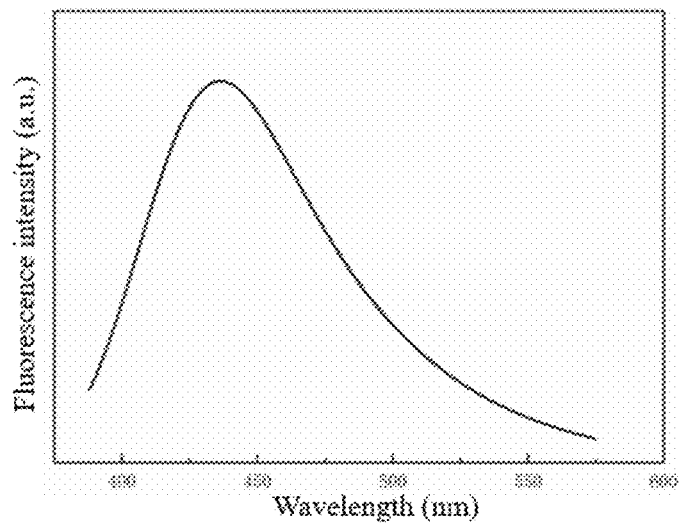
FIG. 4 is a fluorescence emission spectrum of fluorescent carbon quantum dots prepared in the embodiment 1 of the disclosure.

As can be seen from FIG. 4, the fluorescent carbon quantum dots prepared by the embodiment 1 of the disclosure exhibit a significant fluorescence emission peak, and a fluorescence intensity peak appears at 436 nm, indicating that the fluorescent carbon quantum dots have good fluorescence characteristics.

Embodiment 2

A reaction device is added with 80 mL of absolute ethanol. Two electrodes are then inserted and completely immersed in the absolute ethanol. The reaction device is introduced with argon gas with a gas flow rate of 1 L/min. Each of the two electrodes is a hollow stainless-steel tube with an outer diameter of 4 mm and an inner diameter of 3 mm, and the spacing between the two electrodes is 1 mm A pulsed high voltage is applied onto both ends of the two electrodes in the argon gas atmosphere with a voltage amplitude of 3 kV and a frequency of 1 kHz, and a current is 80 A. After 15 min of electro-discharge, the color of the reaction solution changes to yellowish-brown. The reaction solution is then centrifuged to remove a bottom sediment to thereby obtain a mixture of carbon quantum dots.

Figure 5:
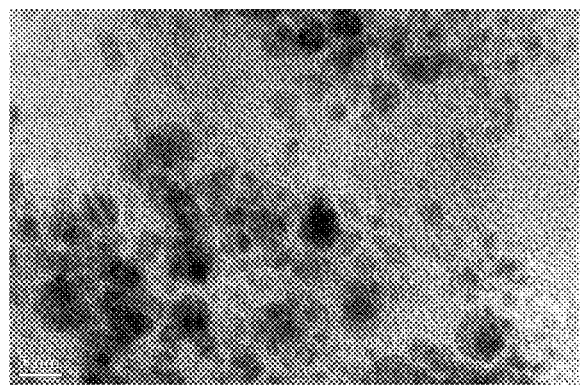
FIG. 5 is a high-resolution transmission electron microscopy (HRTEM) image of fluorescent carbon quantum dots prepared in an embodiment 2 of the disclosure.

As can be seen from FIG. 5, the fluorescent carbon quantum dots prepared by the embodiment 2 of the disclosure have a certain crystallinity.

Embodiment 3

A reaction device is added with 80 mL of cyclohexane. Two electrodes are then inserted and completely immersed in the cyclohexane. The reaction device is introduced with argon gas with a gas flow rate of 1.5 L/min. Each of the two electrodes is a hollow stainless-steel tube with an outer diameter of 4 mm and an inner diameter of 3 mm, and the spacing between the two electrodes is 1 mm A pulsed high voltage is applied onto both ends of the two electrodes in the argon gas atmosphere with a voltage amplitude of 2.5 kV and a frequency of 2 kHz, and a current is 80 A. After 10 min of electro-discharge, the color of the reaction solution changes to yellowish-brown. The reaction solution is then centrifuged to remove a bottom sediment to thereby obtain a mixture of carbon quantum dots.

Figure 6:
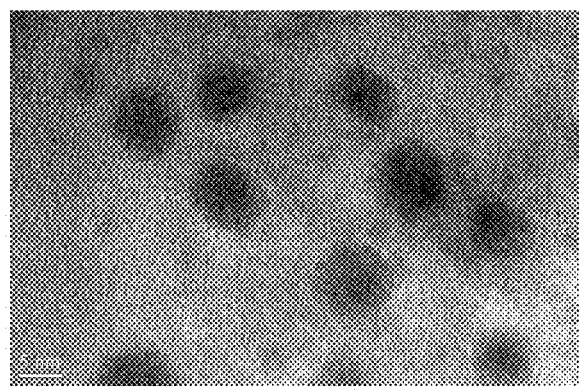
FIG. 6 is a high-resolution transmission electron microscopy (HRTEM) image of fluorescent carbon quantum dots prepared in an embodiment 3 of the disclosure.

As can be seen from FIG. 6, fluorescent carbon quantum dots prepared by the embodiment 3 of the disclosure have a good dispersion and a good crystallinity.

The above description is only some specific embodiments of the disclosure. Apparently, the disclosure is not limited to the above illustrated embodiments, and can have other modifications. All modifications directly derived or indirectly extended by those skilled in the related art from the illustrated embodiments of the disclosure shall be considered as a protection scope of the disclosure.

What is claimed is:

1. A method for preparing fluorescent carbon quantum dots by using gas-liquid two-phase plasma, comprising:
    step S1: preparing a reaction solution and inserting two electrodes into the reaction solution, then injecting an inert gas into the reaction solution and applying a voltage onto both ends of the two electrodes under an atmosphere of the inert gas for carrying out a discharge reaction to generate plasma between the two electrodes until a color of the reaction solution becomes yellowish-brown; and
    step S2: performing a centrifugal separation of the reaction solution after the discharge reaction to remove a sediment, thereby obtaining fluorescent carbon quantum dots;
    wherein the inert gas is argon gas and a gas flow rate of the argon gas is 0.5~2 liters per minute (L/min);
    wherein the voltage applied onto both ends of the two electrodes is a pulsed voltage with a voltage amplitude of 2~4 kilovolts (kV) and a frequency of 1~3 kilohertz (kHz), and a current is 60~90 amperes (A);
    wherein a time of the discharge reaction is 5~30 minutes (min).

2. The method for preparing fluorescent carbon quantum dots by using gas-liquid two-phase plasma according to claim 1, wherein the reaction solution comprises at least one selected from the group consisting of absolute ethanol, hexane, cyclohexane, benzene and methylbenzene.

3. The method for preparing fluorescent carbon quantum dots using gas-liquid two-phase plasma according to claim 1, wherein each of the two electrodes is a hollow stainless-steel tube with an outer diameter of 4 millimeters (mm) and an inner diameter of 3 mm, and a distance between the two electrodes is 1~4 mm.

* * * * *